Sept. 4, 1934.                    A. MILLER                    1,972,788
                                 WEATHER STRIP
                               Filed Aug. 9, 1932
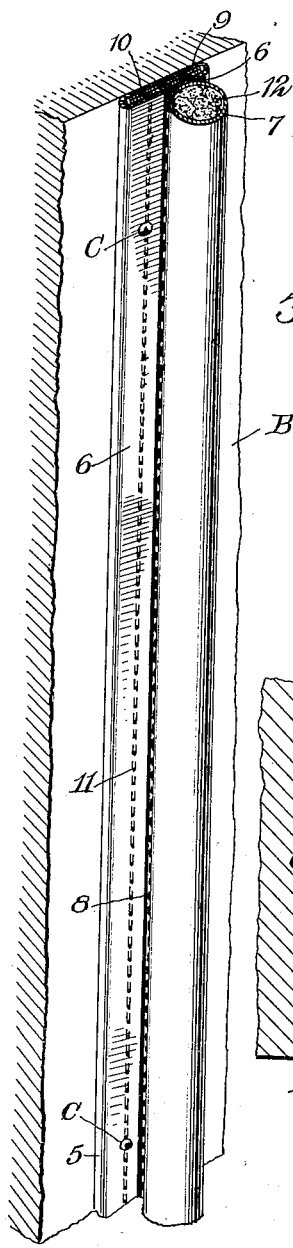
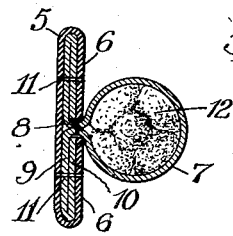
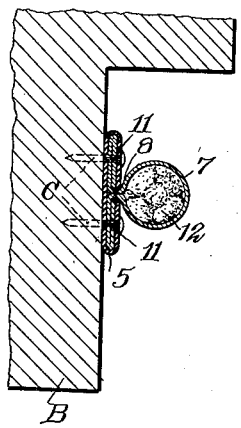
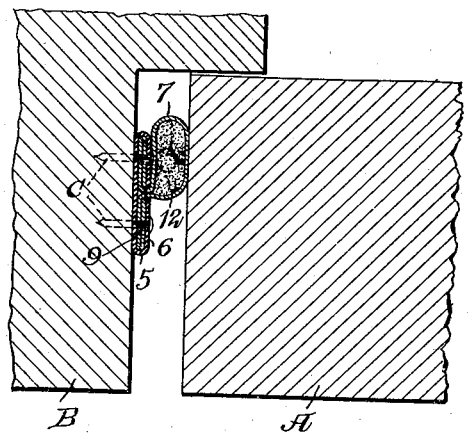
WITNESSES
INVENTOR
Augustus Miller
BY
ATTORNEYS Patented Sept. 4, 1934

1,972,788

UNITED STATES PATENT OFFICE 1,972,788

WEATHER STRIP

Augustus Miller, East Orange, N. J.

Application August 9, 1932, Serial No. 628,096

1 Claim. (Cl. 20—69)

This invention relates to weather strips, especially those which are interposed between the adjacent edges of a swinging closure and its frame, and the present invention is in the nature of an improvement upon my prior United States Letters Patent 1,702,217 granted February 12, 1929.

In addition to accomplishing the same general objects as those set forth in my prior patent above referred to, the present invention aims to provide a weather strip which may be more cheaply manufactured, more readily packaged, handled, cut to length and applied, and one which avoids the necessity of being provided with pre-formed openings for receiving the tacks or other fastening elements which anchor it in place.

With these and other objects in view, reference is made to the following specification and accompanying drawing in which there is exhibited one embodiment of the invention, while the claim defines the actual scope thereof.

In the drawing:

Figure 1 is a perspective view of a weather strip constructed in accordance with the invention illustrating the same in applied position.

Figure 2 is a cross sectional view of the weather strip on an enlarged scale.

Figure 3 is a cross sectional view of the weather strip applied to a door frame with the door out of contact therewith.

Figure 4 is a view similar to Figure 3 illustrating the door in engagement with the weather strip.

Referring to the drawing by characters of reference, the weather strip includes a base 5 which in the present instance is constructed of a flexible strip of material, such as imitation leather or any equivalent material, which has its opposite side edges 6 inturned and directed toward each other, overlying the remainder of the base and slightly spaced apart. A second strip of flexible material is formed into a tube 7 by a line of stitching 8, and the ends 9 of the second strip are outturned or directed away from each other, and have their terminals 10 directed inwardly to overlie the remainder of the ends 9, each of said ends and terminals being disposed between the inturned side edges 6 of the base 5 and secured in place by lines of stitching 11. The arrangement thus described is such that the portion of the second strip which is connected by the line of stitching 8 lies between the inturned ends 6, whereby the tubular part 7 may be deflected or moved laterally with respect to the base. The weather strip further includes a core 12 of stranded material enclosed by the tubular portion 7, whereby the tubular portion 7 and its core are in effect rollable on the base when the weather strip is applied, and whereby the strip may be flattened or deflected, as shown in Figure 4, when the door A moves to a closed position with reference to its frame B. The strip is applied or secured in place by tacks or other similar fastening devices C driven through the opposite sides of the base and the ends and terminals 9 and 10 which are enclosed thereby.

By providing the base of a flexible material, such as ordinary leather or the like, a distinct advantage is gained due to the fact that the flexibility of the structure admits of a more intimate contact of the strip with the surface of the member to which it is applied and the conforming of the strip to the surface of the member. In addition to this the strip may be more readily handled, wound on a reel or otherwise packaged, without permanently distorting it. Furthermore, due to its construction, the improved strip may be more readily cut to handle and will receive the tacks or other fastening devices without the necessity of providing pre-formed openings.

What is claimed is:

A weather strip including a base fashioned from a length of flexible material having inturned opposite side edges directed toward and spaced from each other and overlying the intermediate back portion thereof, and a weathering strip comprising a length of flexible material stitched together and forming a tubular portion and oppositely and inwardly directed free ends disposed in the same plane and each having inturned terminals parallel to the free ends and disposed between the back portion and the inturned opposite edges of the base and stitching extending through four thicknesses of material formed by said base, said back portion and the inturned opposite side edges.

AUGUSTUS MILLER.